(No Model.)
W. MILES.
VEHICLE RUNNING GEAR.
No. 320,269. Patented June 16, 1885.
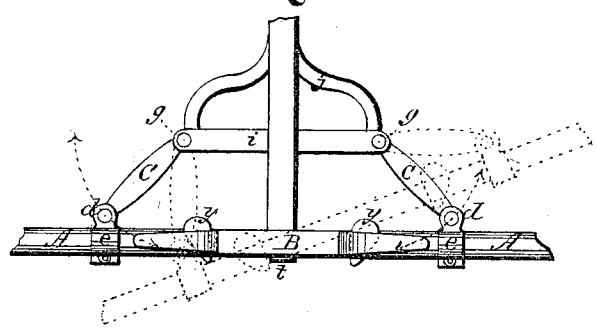
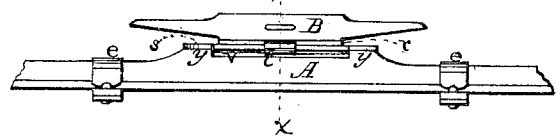
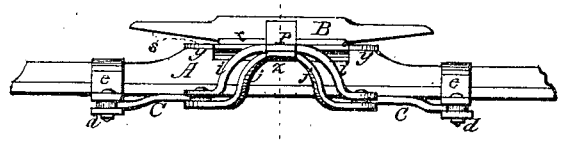
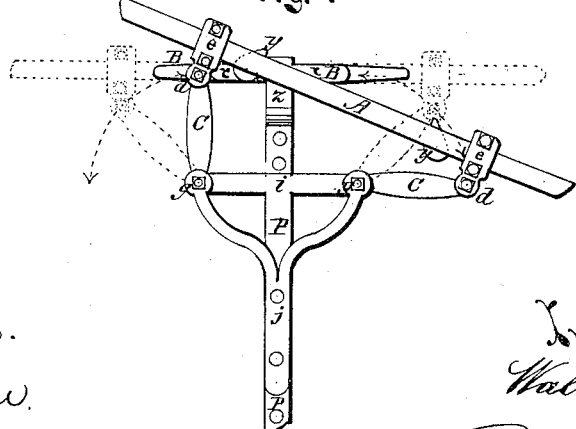
Witnesses.
John Nelson
C. A. Masi
Inventor.
Walter Miles
R. C. Nelson
Atty.

UNITED STATES PATENT OFFICE.

WALTER MILES, OF CHILTON, WISCONSIN.

VEHICLE RUNNING-GEAR.

SPECIFICATION forming part of Letters Patent No. 320,269, dated June 16, 1885.

Application filed March 25, 1885. (No model.)

*To all whom it may concern:*

Be it known that I, WALTER MILES, a citizen of the United States of America, residing at Chilton, in the county of Calumet and State of Wisconsin, have invented certain new and useful Improvements in Running-Gear, of which the following is a specification, reference being had therein to the accompanying drawings.

My invention is an improved running-gear, more especially adaptive to the leading portion of light vehicles, in that it substitutes, in place of the usual king-bolt and fifth-wheel, the following novel elements: A pair of horizontally-vibrating and doubly-pivoted coupling-bars, each bar respectively pivoting by its front end on one side of the perch upon one of the rear nut-bolts, which usually clamp the axle clips or yokes of thill-couplings, and by its rear end upon the nut-bolt which clamps above and below, respectively, the front and rear arms of a pair of curved braces, suitably adjusted and fixed upon the perch-plate, and suitably branching therefrom behind the head-block or bolster; also, the front end of the perch-plate, formed into a bolster-plate, resting and sliding laterally upon an axle-plate, extending laterally underneath said bolster; also, a suitable tongue-piece, forming part of and projecting from the front end of the perch-plate, so bent as to hook and laterally slide within a suitable recess underneath the front edge of said axle-plate, while a guard-plate, having its rear end suitably fixed behind the bolster and underneath the perch-plate, and its front end so bent and passed directly outward and below said bed or axle plate as to similarly clasp and slide underneath the rear edge of the latter, and, finally, check spurs or lugs suitably formed upon each end of said axle-plate, and projecting from its front and rear edges, all of which and their purposes are hereinafter more fully described, and illustrated by the accompanying drawings, in which like letters designate identical parts of my invention in the different figures, respectively.

Figure 1 is a plan view of my device, showing the relative positions of the vibrating coupling-bars, their axle and perch bracing counter-pivots, and the outer ends of the counter check-spurs of the axle bed-plate. Fig. 2 is a front elevation of the same, showing the fronts of the pivot-clips, the front edges of the bolster and axle-plates, and both clasped together by the sliding tongue-hook. Fig. 3 is a rear elevation of the same, showing the relative positions, curves, and bends of the coupling-bars and their pivotal counter-braces. Fig. 4 is an under view of the same, showing the relative positions of the parts when the axle is turned and slid so far as to check against the bolster-plate tongue-hook; and Fig. 5 is a longitudinal section of the same cut in the line $x\ x$ in Fig. 2, showing more especially the positions of the tongue-hook and guard-plate in relation to the axle-plate and bolster.

The letter A represents the front or leading axle of the running-gear; B, the bolster; and C, the pair of coupling-bars. Said bars are made of suitable metal, of fitting size, and bent into the shape shown, so that either may pivot upon one of the vertical nut-bolts $d$, which clamp the axle-clips $e$, and also counter-pivot upon the nut-bolts $g$, which clamp on either side and above and below, respectively, the front and rear arms of the counter-braces $i$ and $j$, the former one of which projects rectangularly from each side of the perch-plate P, and has its pair of arms so curved and bent downward and outward that each may be adjustably and vertically clamped upon the top of the rear end of its respective coupling-bar by the same pivoting nut-bolt which clamps to the bottom of the same end of the same coupling-bar one of the obliquely-bent and curved arms of the bifurcate counter-brace $j$, suitably and adjustably fastened to said perch-plate, and behind the brace $i$, as shown. The bolster-plate $r$ is made as a part of the perch-plate, to branch laterally and rectangularly outward, and is suitably attached underneath the bolster B, as shown, so as to slide upon the axle-plate $s$, which is made of suitable material, and fittingly fastened upon the top of the axle-back to form the bed-plate of said sliding bolster.

In order to guard against any accidental lifting of the bolster, and to prevent its sliding beyond its proper relative positions upon and with the axle, the bolster-plate is furnished with the tongue-hook $t$, the axle-plate with the check-spurs y, and the perch-plate with the guard z. Said tongue-hook is formed upon the extended front end of the perch-plate P, as shown, and so bent as to clasp and laterally slide underneath the front edge of the axle-plate, within the front portion of the recess v, made by suitably chamfering the front and rear top edges of the axle-back. Said check-spurs are suitably formed upon the ends of the axle-plate, and suitably project, as shown, each at an equal and adjustably proper distance from the middle of said plate, for the purpose of checking the further slide of the tongue-hook, or, the same thing, of limiting the turn and slide of the axle and the extent of the vibrations of the coupling-bars C, and the guard z, being formed out of a suitably-bent strip of plate metal, as shown, its rear end secured underneath the perch-plate and behind the tongue-hook, and its front end passed underneath the rear edge of said axle-plate assists said hook in keeping said bolster fittingly upon the axle, while said guard-plate mutually slides within the rear portion of said recess, as shown.

Therefore what I claim as new, and desire to secure by Letters Patent, is—

1. In a running-gear, excluding the usual king-bolt and fifth-wheel, the coupling-bars C, counter-pivoted by the double pairs of nut-bolts d and g to the axle-clips e, and the front and rear arms, respectively, of the pair of curved counter-braces i and j, branching from each side of the perch-plate P, and reciprocally vibrated by the turn and slide of the axle A, underneath the bolster B, mutually counter sliding and riding upon said axle, substantially as and for the purposes herein specified.

2. The counter riding and sliding bolster-plate r, branching from the perch-plate P, furnished with the tongue-hook t and the guard-plate z, and made to reciprocally operate with the counter-sliding axle-plate s by the movement of the axle A, and the mutual counter-vibrations of the doubly-pivoted coupling-bars C, substantially as and for the purposes herein specified.

In testimony whereof I affix my signature in presence of two witnesses.

WALTER MILES.

Witnesses:
J. E. McMULLEN,
J. C. KLEIST.